United States Patent
Lim

(10) Patent No.: US 9,301,272 B2
(45) Date of Patent: Mar. 29, 2016

(54) WIRELESS TRANSMIT/RECEIVE UNIT FOR PROVIDING SERVICES OR ACTIVITIES IN A WIRELESS LOCAL AREA NETWORK

(75) Inventor: Jae Won Lim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 42 days.

(21) Appl. No.: 14/343,687

(22) PCT Filed: May 25, 2012

(86) PCT No.: PCT/KR2012/004171
§ 371 (c)(1),
(2), (4) Date: Mar. 7, 2014

(87) PCT Pub. No.: WO2013/035968
PCT Pub. Date: Mar. 14, 2013

(65) Prior Publication Data
US 2014/0226651 A1    Aug. 14, 2014

Related U.S. Application Data

(60) Provisional application No. 61/531,619, filed on Sep. 7, 2011.

(51) Int. Cl.
*H04J 3/06* (2006.01)
*H04W 56/00* (2009.01)
*H04W 84/12* (2009.01)

(52) U.S. Cl.
CPC ............ *H04W 56/002* (2013.01); *H04W 84/12* (2013.01)

(58) Field of Classification Search
CPC .................................................... H04W 56/002
USPC ........................................................ 370/350
See application file for complete search history.

(56) References Cited

U.S. PATENT DOCUMENTS

| 6,438,117 | B1 * | 8/2002 | Grilli et al. ..................... 370/331 |
| 7,957,317 | B2 * | 6/2011 | Frederiksen .......... H04L 1/1692 370/208 |
| 2005/0128988 | A1 * | 6/2005 | Simpson et al. .............. 370/338 |
| 2009/0034432 | A1 * | 2/2009 | Bonta et al. .................... 370/255 |
| 2009/0168650 | A1 * | 7/2009 | Kesselman .................... 370/235 |
| 2009/0215469 | A1 | 8/2009 | Fisher et al. |
| 2009/0292814 | A1 * | 11/2009 | Ting et al. ..................... 709/229 |
| 2010/0020760 | A1 * | 1/2010 | Grandblaise et al. ......... 370/330 |
| 2010/0202311 | A1 * | 8/2010 | Lunttila ................ H04L 1/0027 370/252 |

FOREIGN PATENT DOCUMENTS

| KR | 10-2011-0037247 | 4/2011 |
| KR | 10-2011-0064289 | 6/2011 |

* cited by examiner

*Primary Examiner* — Gerald Smarth
(74) *Attorney, Agent, or Firm* — Lee, Hong, Degerman, Kang & Waimey

(57) ABSTRACT

The present invention relates to a wireless transmit/receive unit (WTRU), and to a communication method using same, that support MS-based social communication services or activities. The communication method for the WTRU according to one embodiment disclosed in the present description is characterized by comprising the steps of: generating a first service or activity; transmitting, to a second WTRU, a beacon signal including information on the properties of a radio resource corresponding to the first service or activity; receiving, from the second WTRU, an adjustment request for the first service or activity; adjusting the properties of a radio resource corresponding to the first service or activity in response to the request; and transmitting, to the second external WTRU, an adjustment response on the first service or activity including the result of the adjustment.

7 Claims, 8 Drawing Sheets

WIRELESS TRANSMIT/RECEIVE UNIT FOR PROVIDING SERVICES OR ACTIVITIES IN A WIRELESS LOCAL AREA NETWORK

CROSS-REFERENCE TO RELATED APPLICATIONS

This application is the National Stage filing under 35 U.S.C. 371 of International Application No. PCT/KR2012/004171, filed on May 25, 2012, which claims the benefit of U.S. Provisional Application Ser. No. 61/531,619, filed on Sep. 7, 2011, the contents of which are hereby incorporated by reference herein in their entirety.

BACKGROUND OF THE INVENTION

1. Field of the Invention

The present invention relates to a wireless transmit/receive unit for providing services or activities in a wireless local area network and a communication method using the same.

2. Related Art

With the development of a wireless local access network (WLAN), users of a portable terminal such as a laptop computer may perform their tasks because of increased mobility. For example, the user may bring the laptop computer to a conference in order to join the conference and access a local network through the WLAN.

In a system based on an Institute of Electrical and Electronics Engineers (IEEE) 802.11 standard, a basic service set (BSS) indicates a set of stations that successfully achieve synchronization. In addition, a basic service area (BSA) indicates an area containing members constituting the BSS. The BSA may be changed depending on a propagation characteristic of a wireless medium. The BSS may be classified into two constituents of an independent BSS (IBSS) and an infra-structured BSS, and the former which forms a self-contained network indicates a BSS which is not permitted to access a distribution system (DS) and the latter which includes one or more access points (APs) and distribution systems generally indicates a BSS in which the AP is used during all communication processes including communication between stations.

The IEEE 802.11 WLAN standard provides transmission speeds of 11 Mbps (IEEE 802.11b) and 54 Mbps (IEEE 802.11a) using an unauthorized band at 2.4 GHz or 5 GHz. IEEE 802.11g provides a transmission speed of 54 Mbps by applying orthogonal frequency-division multiplexing (OFDM) at 2.4 GHz. IEEE 802.11n provides a transmission speed of 300 Mbps to four spatial streams by applying MIMO-OFDM. IEEE 802.11n supports a channel bandwidth of up to 40 MHz and in this case, provides a transmission speed of 600 Mbps.

In recent years, various social networking based services have attracted public attentions, which including Facebook Twitter, Chatting, Social Commerce, Product Promotion, and the like. Meanwhile, differently from the existing social networking method serviced on an Internet network, SNS services based on positions of a department store, a major supermarket, localized personal broadcasting, a localized SNS, and the like is under research.

SUMMARY OF THE INVENTION

An object of the present invention is to provide a wireless transmit/receive unit for supporting MS based social communication services or activities and a communication method using the same.

Technical Solution

In accordance with an aspect of the present invention, there is provided a wireless transmit/receive unit (WTRU) including the steps of: generating a first service or an activity; transmitting to a second wireless transmit/receive unit a beacon signal including information on an attribute of a radio resource corresponding to the first service or activity; receiving a request for aligning the first service or the activity from the second wireless transmit/receive unit; aligning the attribute of the radio resource corresponding to the first service or activity in response to the request; and transmitting an alignment response of the first service or activity, which includes the aligned result to the second external wireless transmit/receive unit.

In the embodiment, the attribute of the radio resource may include at least one of an offset time, a length, and an interval.

Further, in the embodiment, the attribute of the radio resource may include a frequency band.

In the embodiment, the request may include an attribute designated by the second wireless transmit/receive unit, and in the aligning, the attribute of the radio resource corresponding to the generated first service or activity may be aligned to the designated attribute.

Moreover, in the embodiment, the request may include an attribute of a radio resource corresponding to a second service or an activity generated by a third wireless transmit/receive unit, and in the aligning, the attribute of the radio resource corresponding to the first service or activity may be aligned based on the attribute of the radio resource corresponding to the second service or activity.

In the aligning, at least one of an offset time, a length, and an interval of the radio resource corresponding to the first service or activity may be aligned so as to prevent the radio resource corresponding to the first service or activity from overlapping with the radio resource corresponding to the second service or activity.

In the embodiment, the service or activity may be associated with a social network service (SNS).

Meanwhile, in accordance with another aspect of the present invention, there is provided a communication method of a wireless transmit/receive unit including the steps of: receiving, from a second wireless transmit/receive unit, a beacon signal including information on an attribute of a radio resource corresponding to the first service or activity; receiving, from a third wireless transmit/receive unit, a beacon signal including information on an attribute of a radio resource corresponding to a second service or activity; judging whether there is a part where the radio resource corresponding to the second service or activity overlaps with the radio resource corresponding to the first service or activity; and transmitting a request for aligning the second service or activity to the third wireless transmit/receive unit when there is the part where both radio resources overlap with each other.

In the embodiment, the attribute of the radio resource may include at least one of an offset time, a length, and an interval.

Further, in the embodiment, the attribute of the radio resource may include a frequency band of the zone.

In the embodiment, the request may include an attribute to be aligned so as to prevent the radio resource corresponding to the second service or activity from overlapping with the radio resource corresponding to the first service or activity.

In the embodiment, the request may include information on an attribute of the radio resource corresponding to the second service or activity.

In the embodiment, the service or activity may be associated with a social network service (SNS).

In the embodiment, the communication method may further include the step of receiving a request for aligning the second service or the activity from the third wireless transmit/receive unit.

According to the present invention a wireless transmit/receive unit can provide MS based social services or activities, and even when a plurality of services or activities collides with radio resources corresponding thereto, the radio resource is adjusted so that an MS joins the corresponding service or activity. Since a radio resource of another service or activity is considered during such an adjustment process, another service or activity is not also influenced.

DESCRIPTION OF EXEMPLARY EMBODIMENTS

Figure 1:
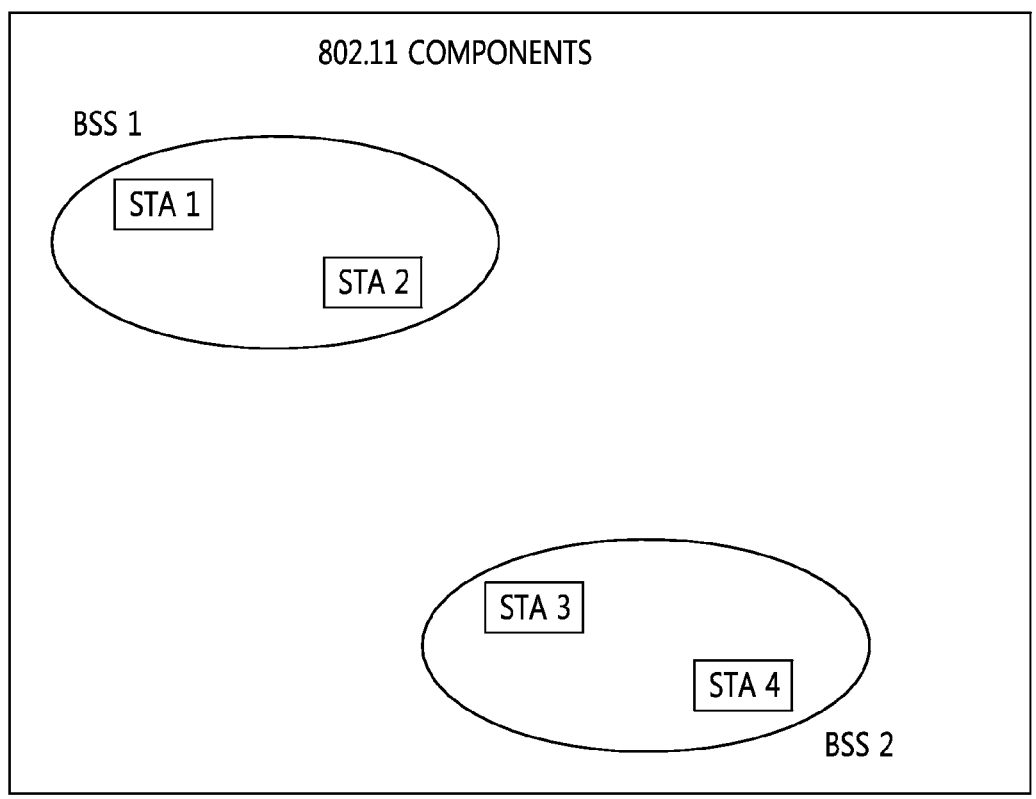
FIG. 1 is a block diagram illustrating an IEEE 802.11 system.

It is noted that Technical terms used in the specification are used to just describe a specific embodiment and do not intend to limit the present invention. Further, if the technical terms used in the specification are not particularly defined as other meanings in the specification, the technical terms should be appreciated as meanings generally appreciated by those skilled in the art and should not be appreciated as excessively comprehensive meanings or excessively reduced meanings. Further, when the technical term used in the specification is a wrong technical term that cannot accurately express the spirit of the present invention, the technical term is substituted by a technical term which can correctly appreciated by those skilled in the art to be appreciated. In addition, a general term used in the present invention should be analyzed as defined in a dictionary or according to front and back contexts and should not be analyzed as an excessively reduced meaning.

Moreover, if singular expression used in the specification is not apparently different on a context, the singular expression includes a plural expression. Further, in the present invention, it should not analyzed that a term such as "comprising" or "including" particularly includes various components or various steps disclosed in the specification and some component or some steps among them may not included or additional components or steps may be further included.

Further, a "module" and a "unit" suffixes for components used in the present invention are given or mixed and used by considering easiness in preparing a specification and do not have a meaning or role distinguished from each other in themselves.

In addition, terms including ordinal numbers, such as 'first', 'second', etc. can be used to describe various components, but the components should not be limited by the terms. The above terminologies are used only to discriminate one component from the other component. For example, a first component may be named as a second component and similarly, the second component may also be named as the first component.

Hereinafter embodiments of the present invention will be described in detail with reference to the accompanying drawings, in which like or similar reference numerals refer to like elements regardless of reference numerals and a duplicated description thereof will be omitted.

In describing the present invention, when it is determined that the detailed description of the known art related to the present invention may obscure the gist of the present invention, the detailed description thereof will be omitted. Further, it is noted that the accompanying drawings are used just for easily appreciating the spirit of the present invention and it should not be analyzed that the spirit of the present invention is limited by the accompanying drawings.

Hereinafter, the present invention will be described in brief for understanding prior to describing embodiments of the present invention in detail.

In a description below, a station (STA) represents a predetermined device including a media access control (MAC) to a wireless medium (WM) that follows IEEE 802.11 and a physical layer (PHY). The STA may be an AP or a non-AP STA, but unless not additionally represented hereinbelow, the STA represents the non-AP STA. The STA may be called other names such as user equipment (UE), a mobile station (MS), a mobile terminal (MT), a portable device, an interface card, and the like.

Further, in a description below, the access point (AP) represents a predetermined entity that has an STA function to provide the access to a distribution service through the WM for associated STAs. In other words, the AP is a functional medium that provides a connection through the wireless medium. The AP may be called other names such as a centralized controller, a base station (BS), a scheduler, and the like.

Further, in the description below, the mobile station (MS) represents an STA of a type using network communication in moving and the wireless medium (WM) represents a medium used to implement transmission of protocol data units (PDUs) among peer physical layer (PHY) entities of a WLAN.

Description of FIG. 1

FIG. 1 is a block diagram illustrating an IEEE 802.11 system.

An IEEE 802.11 architecture is constituted by a plurality of components that interact with each other in order to provide the WLAN that transparently supports STA mobility to a higher layer.

A basic service set (BSS) is a basic component of an IEEE 802.11 LAN. The IEEE 802.11 system illustrated in FIG. 1 includes two BSSs including two terminals (STAs) 10 and 20 and 30 and 40 which are components of the BSS. In the BSS of the IEEE 802.11 system, the STAs and the APs communicate with each other.

The BSS may be an oval used for description as a coverage area where the constituent terminals 10 and 20 and 30 and 40 of the BSS may maintain communication. The area is a so-called basic service area (BSA). When the terminal 10 or 30 escapes from the BSA, the terminal may not communicate directly with other terminals that are present in the BSA.

Figure 2:
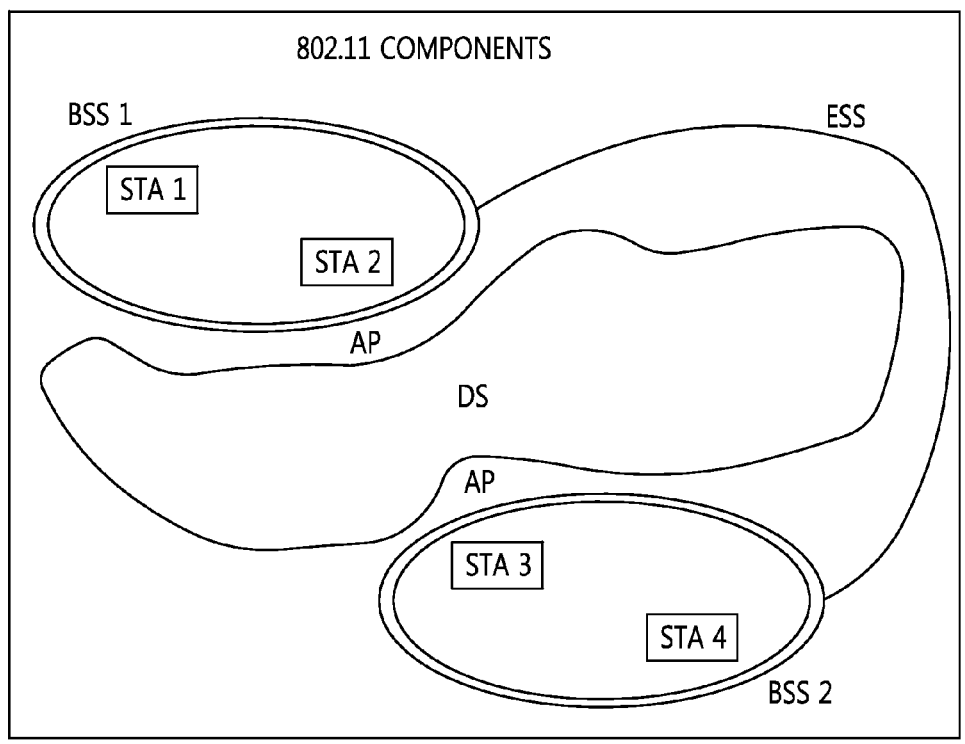
FIG. 2 is a block diagram illustrating another IEEE 802.11 system.

Description of FIG. 2

FIG. 2 is a block diagram illustrating another IEEE 802.11 system.

The WLAN system includes at least one basic service set (BSS). The BSS is a set of stations (STAs) which are successfully synchronized to communicate with each other. The BSS may be classified into an independent BSS and an infrastructured BSS. Further, the BSS may form a network component of an extended type which may be independently present or be constituted by a plurality of BSSs. A component of an architecture used to interconnect the BSSs is a distribution system (DS).

The IEEE 802.11 standard logically divides the wireless medium (WM) from a distribution system medium (DSM). Respective logical media are used by different components of the architecture and for different purposes. An IEEE 802.11 definition does not disable and require a plurality of media to be the same as or different from each other.

Understanding that the plurality of media are different from each other is a core used to understand the mobility of the architecture. The IEEE 802.11 LAN architecture is independently designated from a predetermined detailed implemented physical feature.

The DS processes an address for destination mapping and provides a logical service required for seamless integration of various BSSs to support a mobile device.

The AP represents a predetermined entity that has the function of the STA and enables the access to the DS through the WM for the associated STAs.

Data is transmitted between the BS and the DS through the AP. It is noted that All APs are also STAs. Therefore, the APs are addressable entities. Addresses used by the AP for communication on the WM and the DSM are not requisitely the same as each other.

Data transmitted to the STA address of the AP by one of the associated STAs is continuously received in a port that is not controlled to be processed by an IEEE 802.1X port access entity. Further, when a controlled port is applied, frames conceptually transport the DS.

The DS and the BSSs generates a wireless network in which the IEEE 802.11 standard has a predetermined size and predetermined complexity. The IEEE 802.11 standard calls the network of such a type as an ESS network. An ESS is a combination of BSSs connected by the DS. The ESS does not include the DS.

The ESS network is a core concept that is made to be regarded as an independent basic service set (IBSS) network in a logical link control (LLC) layer. The STAs in the ESS may communicate with each other and the STAs may transparently move from one BSS to another BSS in the LLC (in the same ESS).

The IEEE 802.11 standard does not assume a relative physical position of the BSSs. However, for example, the following cases are available.

a) The BSSs may partially overlap with each other. This is generally used to align consecutive coverage in a physical volume.

b) The BSSs may be physically separated from each other. There is no logical limitation in distance between the BSSs.

c) The BSSs may be physically arranged in the same place. This is to provide redundancy.

d) One (or more) IBSS or ESS networks may be physically present in the same space as one (or more) ESS networks. This occurs due various reasons. For example, the above cases are available when an Ad-hoc network operates at a position including even the ESS network, when IEEE 802.11 networks which physically overlap with each other are set by different organizations, and when two or more accesses and security policies are required at the same position.

Referring to FIG. 2, a BSS1 and a BSS2 are the infrastructured BSSs including an STA2 (AP1) and an STA3 (AP2), respectively. The BSS1 includes the STA1 and the STA2 (AP1). The BSS2 includes the STA3 (AP2) and an STA4. The BSS1 and the BSS2 are connected to each other by using the distribution system (DS). The extended service set (ESS) includes the plurality of BSSs that are connected through the DS. In the same ESS, the non-AP STA may move from the BSS to another BSS while performing seamless communication.

In the description below, a social communication activity (SCA) means communication between devices that is concerned with the same specific social service or social activity. The existing communication method is a destination oriented communication method in which a device transmitting data knows which predetermined a device receiving data is and transfers information like, for example, the MS or the AP. Unlike this, according to the communication method according to the embodiments disclosed in the specification, devices do not retrieve another specific device but receives information on the SCA, retrieves a communication area for the SCA, and communicates with other devices in the corresponding communication area. Further, the SCA needs to follow an operating method of the corresponding social activity for communication among devices that have respective different communication characteristics and are concerned with the same SCA.

In the description below, the device is used as a meaning including both the AP and the MS.

According to the embodiments disclosed in the specification, the information on the SCA generated by the MS is transmitted to other MSs to allow a specific SCA to be performed between the MSs. In this case, the SCA provides a service in a social zone scheduled by the MS, and herein, the social zone means a radio source which the MS may retrieve and to which the MS may transmit/receive data in order to perform the specific SCA. The social zone may be defined by dividing the radio resource by a time or a frequency. In the specification, defining the social zone by dividing the radio resource by the time will be described as an example in order to describe the definition and an actual use example of the social zone.

Figure 3:
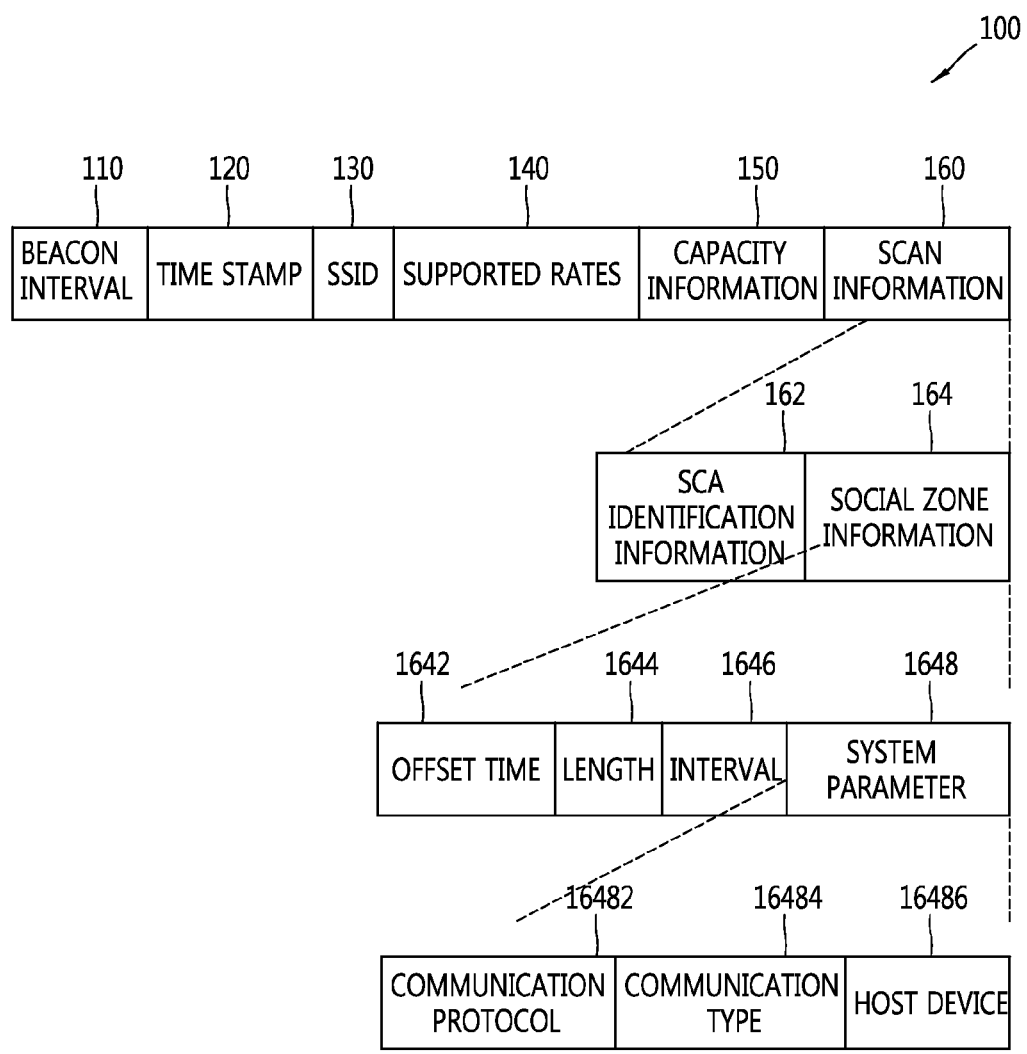
FIG. 3 is a diagram disclosing an exemplary format for a beacon signal header 100.

Description of FIG. 3

FIG. 3 is a diagram disclosing an exemplary format for a beacon signal header 100. The beacon signal header 100 may include, for example, a part of a beacon signal frame transferred from a wireless terminal to another wireless terminal. As illustrated in FIG. 3, the beacon header 100 for the exemplary implementation includes a beacon interval field 110, a time stamp field 120, a supported transmission rate field 130, a capacity information field 140, a service set identifier (SSID) field 150, and an SCA information field 160.

The MS according to the embodiment disclosed in the specification periodically transmits SCA information included in a communication range (coverage) to at least one other MS through a social beacon (SB). The SCA information field 160 included in the social beacon may include a social communication activity (SCA) identification information (ID) field 162 and a social zone information field 164. The social beacon may include a list of paring information social zone information (SCA_ID).

The SCA_ID is information prepromised among the MSs and a specific SCA_ID may be mapped to a specific SCA one to one. That is, as an example of the SCA_ID, SCAs such as chatting, social commerce information, a game, and the like are substituted with a specific SCA_ID value, and as a result, the SCA_ID may be used for the MS to notify information regarding which SCA a specific social zone is used for to another MS.

The social zone information is used to represent how the social zone used for the specific SCA is configured or which communication method the MSs need to follow in order to communicate with each other in the corresponding social zone. The social zone information includes a social zone offset time field 1642, a social zone length field 1644, a social zone interval field 1 field 1646, and a social zone system parameter field 1648. Alternatively, the social zone information includes information on a frequency band. The information on the frequency band includes a start frequency and an end frequency.

A social zone offset time represents when the corresponding social zone is started, that is, a start time, a social zone length represents the size of the corresponding social zone, a social zone interval represents a value regarding at which interval the social zone is repeated, and a social zone parameter includes communication parameters and communication protocol information which the MSs need to know for communication in the corresponding social zone.

Description of Embodiment Disclosed in Specification

An embodiment disclosed in the specification relates to a method that performs localized social communication among the MSs on the WLAN. That is, the embodiment defines a method in which the MSs generate the SCA, transmit a data frame including information on the corresponding SCA and information on a social zone where the corresponding SCA is serviced, other neighboring MSs that receive the data frame retrieve their concerned social zones to receive the data frame or communicate with neighboring MSs in the social zone of the corresponding SCA by using an SCA communication method of the corresponding social zone.

According to the embodiment disclosed in the specification, the MS that intends to perform a specific SCA retrieves the SCA through a wireless channel to generate the corresponding SCA where there is no SCA which the MS intends to join in therearound and transmit information on the generated SCA through the wireless channel, and as a result, other neighboring MSs retrieve the corresponding SCA to perform SCA associated communication in the social zone of the corresponding SCA.

Figure 4:
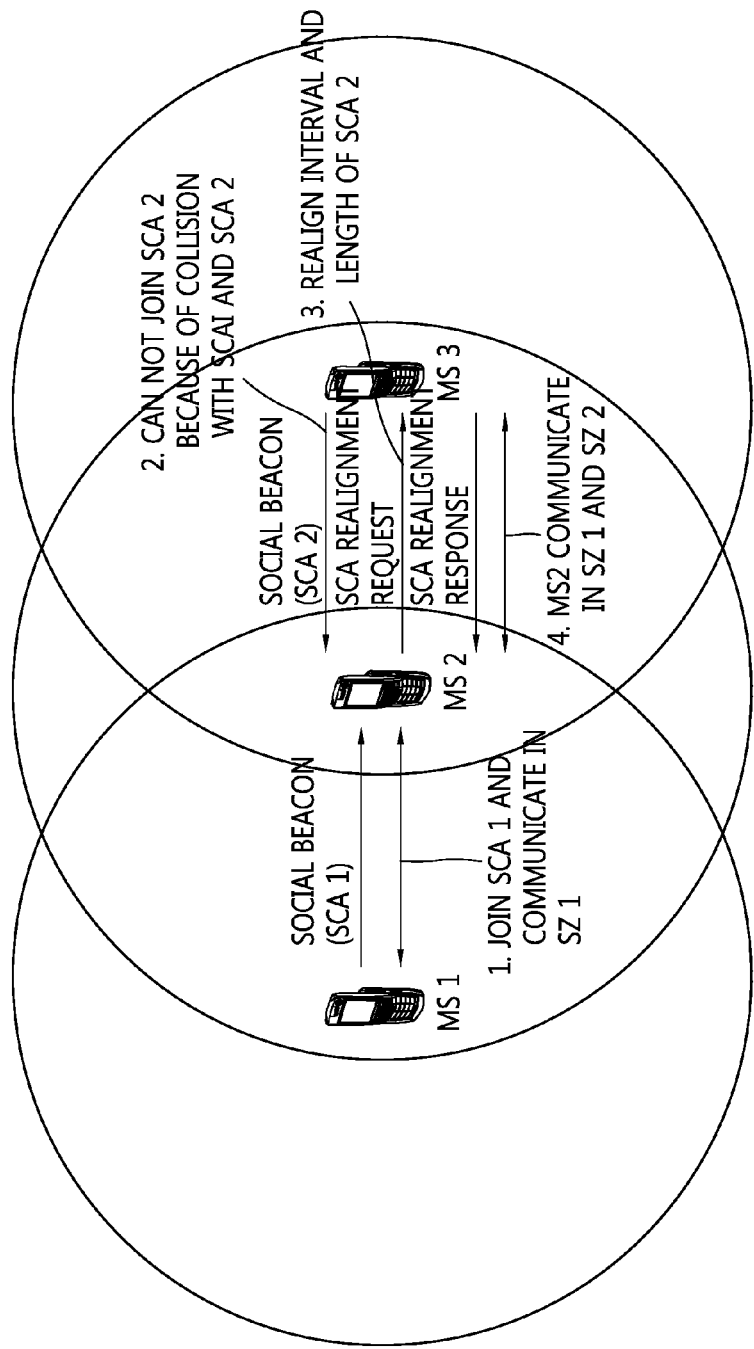
FIG. 4 is a conceptual diagram illustrating a process in which an MS according to an exemplary embodiment disclosed in the specification transmits information on an SCA started thereby through a social beacon and neighboring MSs that receive the corresponding information retrieves a social zone of an SCA interested thereby to perform the SCA.

Description of FIG. 4

FIG. 4 is a conceptual diagram illustrating a process in which an MS according to an exemplary embodiment disclosed in the specification transmits information on an SCA started thereby through a social beacon and neighboring MSs that receive the corresponding information retrieves a social zone of an SCA interested thereby to perform the SCA.

That is, an MS1 generates an SCA1 and transmits a social beacon including information on the SCA1. A neighboring MS2 receives the social beacon transmitted by the MS1 and thereafter, performs an operation of the SCA1 in a social zone SZ1 of the SCA1 to communicate with the MS1. Thereafter, an MS3 adjacent to the MS2 starts an SCA2 and transmits a social beacon including information an SCA2. The MS2 intends to receive a social beacon of the MS3 and thereafter, join in even the SCA2, but lengths and intervals of the SCA1 and the social zone are different from each other, and as a result, it is difficult that the MS2 joins in both the SCA1 and the SCA2.

In this case, the MS2 transmits an SCA realignment request message to the MS3, and as a result, the MS2 requests a length and an interval of a social zone of SZ2 of the SCA2 so as to join both the SCA1 and the SCA2.

The MS3 aligns the length and the interval of the social zone SZ2 of the SCA2 started thereby to a length and an interval of the social zone SZ1 of the SCA1 and transmits an SCA realignment response message to the MS2. Thereafter, information on a social beacon transmitted by the MS3 is also modified and transmitted according to the information on the social zone of the aligned SCA2. The MS2 that receives the SCA realignment response joins in both the SCA1 and the SCA2 to communicate with the MS1 and the MS3.

An SCA realignment request message includes information (the offset time, the length, and the interval of the social zone) for aligning a social zone to the SCA to be aligned. In this case, the MS that transmits the SCA realignment request message may transmit the SCA realignment request message by designating a length and an interval of the social zone of an SCA to be modified and includes information on a social zone of another SCA which may be received by the MS, and as a result, the MS that receives the SCA realignment request message may modify the social zone information of the SCA started thereby by referring the corresponding value.

The SCA realignment response message is used when the SCA realignment request message is received, and as a result, the social zone information (the offset time, the length, and the interval of the social zone) of the aligned SCA is transmitted to the MS that requests realigning the SCA.

Figure 5:
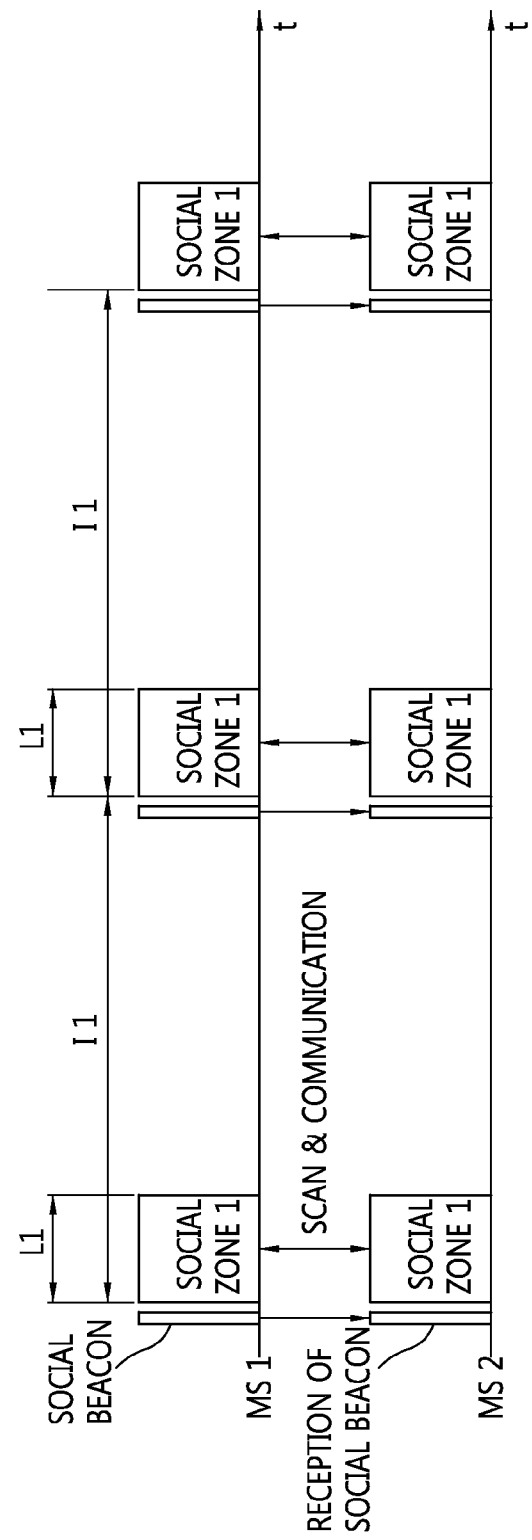
FIG. 5 is a conceptual diagram illustrating a process in which the MS starts a specific SCA and the neighboring MSs communicate with each other through the social zone of the corresponding SCA according to an exemplary embodiment disclosed in the specification.

Description of FIG. 5

FIG. 5 is a conceptual diagram illustrating a process in which the MS starts a specific SCA and the neighboring MSs communicate with each other through the social zone of the corresponding SCA according to an exemplary embodiment disclosed in the specification.

That is, the MS1 generates the SCA1 and periodically transmits the social beacon including the information on the SCA1. The neighboring MS2 receives the corresponding social beacon, verifies the information on the social zone 1 where the SCA1 operates, and thereafter, communicates with the MS 1 through the corresponding social zone according to the SCA1. In FIG. 5, L1 represents length information of the social zone 1 of the SCA1 and I1 represents interval information of the social zone 1 of the SCA1.

Figure 8:
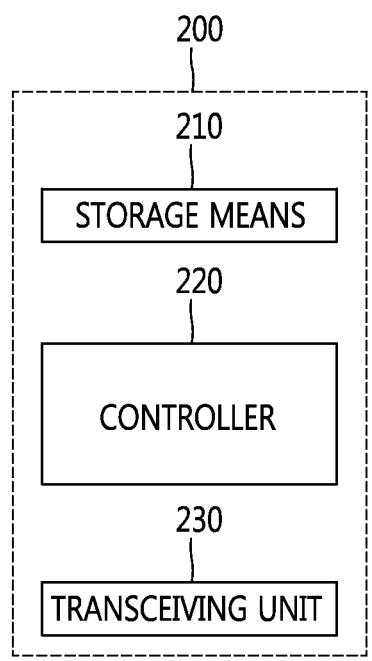
FIG. 8 is a block diagram of an MS 200 disclosed in the present description.

In this case, as illustrated in FIG. 8, the transmission interval and the interval of the social zone need not particularly coincide with each other. Further, the MS starts a plurality of SCAs to make information on the corresponding SCAs be included in the social beacon.

Figure 6:
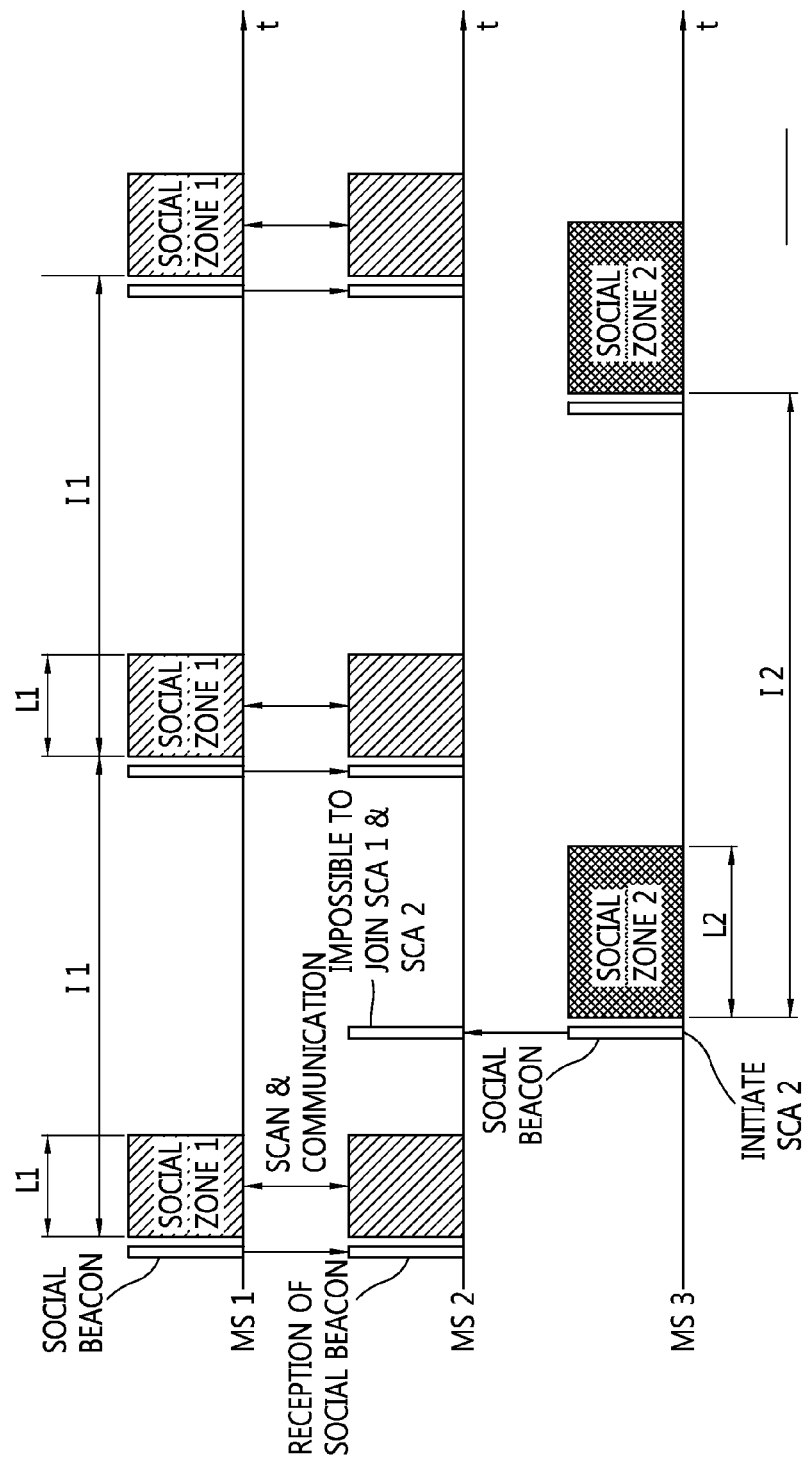
FIG. 6 is a conceptual diagram illustrating a case in which when a plurality of SCAs started by different MSs is present in a specific zone, resources of the social zones of the corresponding SCAs overlap with each other at a specific time, the MS which is positioned in a place to simultaneously access the plurality of SCAs is disabled to operate in the social zones of the plurality of SCAs.

Description of FIG. 6

FIG. 6 is a conceptual diagram illustrating a case in which when a plurality of SCAs started by different MSs is present in a specific zone, resources of the social zones of the corresponding SCAs overlap with each other at a specific time, the MS which is positioned in a place to simultaneously access the plurality of SCAs is disabled to operate in the social zones of the plurality of SCAs.

Referring to FIG. 6, the social zone 1 of the SCA1 started by the MS1 and the social zone 2 of the SCA2 started by the MS3 occupy the same radio resource in a specific time zone. In this case, the MS2 intends to join in both the SCA1 and the SCA2, but the MS2 may not do so. That is, the MS2 needs to select only one of the first SCA1 and the SCA2 to communicate with the selected one. In FIG. 6, I1 and L1 represent the interval and the length of the social zone 1 of the SCA1 and I2 and L2 represent the interval and the length of the social zone 2 of the SCA2.

Figure 7:
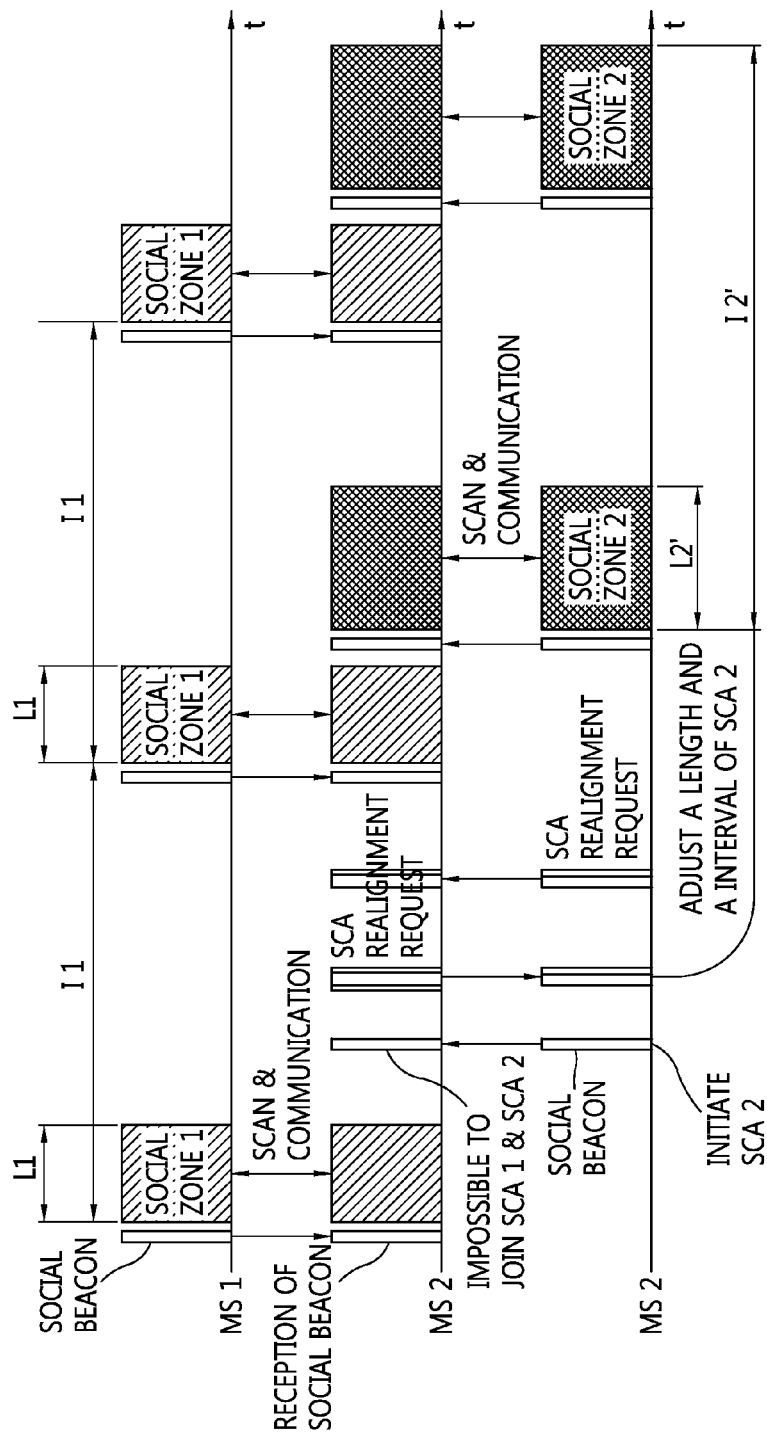
FIG. 7 is a conceptual diagram illustrating a method of readjusting the social zone between the SCAs in order to the situation illustrated in FIG. 6, that is, a problem that a plurality of SCA communications are impossible simultaneously.

Description of FIG. 7

FIG. 7 is a conceptual diagram illustrating a method of readjusting the social zone between the SCAs in order to the situation illustrated in FIG. 6, that is, a problem that a plurality of SCA communications are impossible simultaneously.

The MS2 that receives the information the SCA1 and the SCA2 from the MS2 and the MS3 through the social beacon knows that it is difficult to join in both the SCA1 and the SCA2, and transmits the SCA realignment request message to request realigning resource assignment of the social zone 2 of the SCA2 of the MS2 to the MS3, and the MS3 verifies the information on the social zone 1 of the SCA1 included in the SCA realignment request message and realigns the size of the interval of the social zone 2 of the SCA2. The MS3 transmits the SCA realignment response message to the MS2 after the alignment of the social zone 2 of the SCA2 is completed to notify that the social zone 2 of the SCA2 is aligned. Thereafter, the MS2 joins in both the SCA1 and the SCA2 to communicate with the MS1 and the MS3, respectively. In FIG. 7, I2' and L2' represent the interval and the length of the social zone 2 of the SCA2.

Description of FIG. 8

FIG. 8 is a block diagram of an MS 200 disclosed in the present specification.

As illustrated in FIG. 8, the MS 200 includes a storage means 210, a controller 220, and a transceiving unit 230. The storage means 210 stores the methods according to the embodiments illustrated in FIGS. 1 to 7. The controller 220 controls the storage means 210 and the transceiving unit 230. In detail, the controller 220 executes the methods stored in the storage means 210. In addition, the controller 220 transmits the aforementioned signals through the transceiving unit 230.

As described above, it is to be appreciated that embodiments described above are intended to be illustrative in every sense, and not restrictive. The scope of the present invention is represented by the claims to be described below rather than the detailed description, and it is to be interpreted that the meaning and scope of the claims and all the changes or modified forms derived from the equivalents thereof come within the scope of the present invention.

What is claimed is:

1. A communication method comprising:
generating, by a first wireless transmit/receive unit (WTRU), a first social communication activity (SCA);
transmitting, by the first WTRU to a second WTRU, social beacon signal including information on an attribute of a radio resource corresponding to the first SCA,
wherein the information included in the social beacon signal relates to a social activity identifier (ID) and social zone information;
receiving, by the first WTRU from the second WTRU, a request for aligning the first service or the activity;
aligning, by the first WTRU, the attribute of the radio resource corresponding to the first SCA in response to the request; and
transmitting, by the first WTRU to the second WTRU, an alignment response of the first SCA, the alignment response including an aligned result,
wherein the request includes an attribute of a radio resource corresponding to a second SCA generated by a third WTRU, and
wherein the attribute of the radio resource corresponding to the first SCA is aligned based on the attribute of the radio resource corresponding to the second SCA.

2. The method of claim 1, wherein:
the attribute of the radio resource includes at least one of an offset time, a length, and an interval.

3. The method of claim 1, wherein:
the attribute of the radio resource includes a frequency band.

4. The method of claim 1, wherein:
the request includes an attribute designated by the second WTRU, and
in the aligning, the attribute of the radio resource corresponding to the generated first SCA is aligned to the designated attribute.

5. The method of claim 1, wherein:
in the aligning, at least one of an offset time, a length, and an interval of the radio resource corresponding to the first SCA is aligned so as to prevent the radio resource corresponding to the first SCA from overlapping with the radio resource corresponding to the second SCA.

6. The method of claim 1, wherein:
the first SCA is associated with a social network service (SNS).

7. A wireless transmit/receive unit (WTRU), comprising:
a transceiver; and
a processor coupled to a memory and configured to:
generate a first social communication activity (SCA);
transmit to a second WTRU a social beacon signal including information on an attribute of a radio resource corresponding to the first SCA,
wherein the information included in the social beacon signal relates to a social activity identifier (ID) and social zone information;
receive a request for aligning the first service or the activity from the second WTRU;
align the attribute of the radio resource corresponding to the first SCA in response to the request; and
transmit, to the second WTRU, an alignment response of the first SCA, the alignment response including an aligned result,
wherein the request includes an attribute of a radio resource corresponding to a second SCA generated by a third WTRU, and
wherein the attribute of the radio resource corresponding to the first SCA is aligned based on the attribute of the radio resource corresponding to the second SCA.

* * * * *